(12) United States Patent
Axelsson et al.

(10) Patent No.: US 7,013,152 B2
(45) Date of Patent: Mar. 14, 2006

(54) METHOD AND AN ARRANGEMENT IN A NETWORK FOR DETERMINING A ZONE IN WHICH A COMMUNICATION UNIT IS CONNECTED

(75) Inventors: Pontus Axelsson, Stockholm (SE); Bengt Johansson, Stockholm (SE); Lars Nordgren, Stockholm (SE); Xavier Aubry, Stockholm (SE)

(73) Assignee: Appear Networks Systems AB, Stockholm (SE)

( * ) Notice: Subject to any disclaimer, the term of this patent is extended or adjusted under 35 U.S.C. 154(b) by 0 days.

(21) Appl. No.: 10/331,601

(22) Filed: Dec. 31, 2002

(65) Prior Publication Data
US 2005/0009545 A1 Jan. 13, 2005

(30) Foreign Application Priority Data
Nov. 28, 2002 (SE) .................................. 0203516

(51) Int. Cl.
*H04Q 7/20* (2006.01)

(52) U.S. Cl. ............................... 455/456.5; 455/456.6; 455/456.1; 370/328; 370/351; 340/825.49

(58) Field of Classification Search ............ 455/456.5, 455/456.6, 456.1, 422.1; 370/328, 235, 310.2, 370/351; 340/825.49
See application file for complete search history.

(56) References Cited

U.S. PATENT DOCUMENTS

| 5,717,745 | A | * | 2/1998 | Vijay et al. ............. 379/112.05 |
| 6,192,413 | B1 | * | 2/2001 | Lee et al. .................... 709/238 |
| 6,785,245 | B1 | * | 8/2004 | Lee et al. .................... 370/256 |
| 6,831,902 | B1 | * | 12/2004 | Dougherty et al. ......... 370/328 |
| 2003/0030568 | A1 | * | 2/2003 | Lastinger et al. ...... 340/825.49 |
| 2003/0040313 | A1 | * | 2/2003 | Hogan et al. ................ 455/435 |
| 2004/0085931 | A1 | * | 5/2004 | Rezaiifar .................... 370/331 |

FOREIGN PATENT DOCUMENTS

| WO | 02054813 | 7/2002 |
| WO | 02058267 | 7/2002 |
| WO | 02058290 | 7/2002 |
| WO | 02058346 | 7/2002 |

* cited by examiner

*Primary Examiner*—Danh C. Le
(74) *Attorney, Agent, or Firm*—Harness, Dickey & Pierce PLC

(57) ABSTRACT

In a network including access points, via which communication units can connect to the network, wherein each of the access points belongs to a zone, a method comprising the steps of assigning a message type to each of the zones in the network; receiving from the communication unit a query message for each zone, where the query message for each zone is of the message type assigned to that zone; filtering the query messages at an access point, via which the communication unit is connected to the network, so that only the query message of the message type, which is assigned to the zone to which the access point belongs, is allowed to pass through; and determining the zone, to which the access point belongs, depending on the query message allowed to pass through in the step of filtering.

36 Claims, 2 Drawing Sheets

METHOD AND AN ARRANGEMENT IN A NETWORK FOR DETERMINING A ZONE IN WHICH A COMMUNICATION UNIT IS CONNECTED

PRIORITY STATEMENT

This application claims the priority of Swedish Patent Application No. 0203516-0, filed on Nov. 28, 2002, in the Swedish Patent Office, the disclosure of which is incorporated herein in its entirety by reference.

TECHNICAL FIELD OF THE INVENTION

The present invention generally relates to the field of communications and more specifically the invention relates to methods and arrangements in a network for determining a zone in which a communication unit is connected. The invention is particularly suited for, but not limited to, determining a zone in a wireless local area network (WLAN) in which a wireless radio communication device is connected.

DESCRIPTION OF RELATED ART AND BACKGROUND OF THE INVENTION

The Global Positioning System (GPS) uses a combination of orbiting satellites to determine position coordinates. GPS works great in most outdoor areas, but the satellite signals are not strong enough to penetrate inside most indoor environments. As a result, new indoor positioning technologies that make use of 802.11 wireless LAN's are beginning to appear on the market.

Indoors positioning typically requires the implementation for each hardware vendor used, or deployment of specialized equipment that integrates with the network. Solutions known to Applicant are based on measuring of signal strengths of (or signal travel time to) access points and triangulation, or on adding hardware components to the access points so that the system can detect which hardware component the network traffic goes through. Different such solutions of this kind are disclosed in WO02/054813 A1 (EKAHAU), WO02/058267 A2 (BLUESOFT), WO02/058290 A1 (BLUESOFT), and WO02/058346 A2 (BLUESOFT).

SUMMARY OF THE INVENTION

The inventors of the present invention have noted some drawbacks and limitations of the prior art solutions as specified above. The solutions can be evaluated along the following criteria: continuous tracking capability; need for specific access point hardware; need for specific client hardware; need for custom hardware components; robustness; capability to work with different radio networks.

None of the solutions known to the inventors provide robust continuous tracking that works in several different radio networks without proprietary hardware or specific hardware.

Another drawback of these solutions is that they require substantial calibration, that could be obsolete whenever the network properties change (access points are added or removed, furniture/walls are added or removed, density of visitors varies), which is a major issue in public places.

It is thus an object of the present invention to provide a method and arrangement for establishing a position of a communication unit in a network, which are simpler, cheaper, faster, and/or more competitive as compared to the prior art solutions identified above.

In this respect there is a particular object to provide such a method and such an arrangement, which do not depend on added hardware components to the access points or on complicated calculations.

It is a further object of the invention to provide a network agnostic solution, which is not dependent on any particular network technology, but can be implementing in any kind of network, and which is vendor independent and does not require hardware from any particular vendor.

It is yet a further object of the invention to provide such a method and such an arrangement, which determine a position of a wireless communication unit such as a laptop or a PDA device in a wireless network such as a wireless local area network.

These objects among others are, according to the present invention, attained by methods and arrangements as claimed in the appended patent claims.

Further characteristics of the invention, and advantages thereof, will be evident from the following detailed description of preferred embodiments of the present invention given hereinafter and the accompanying FIGS. 1-4, which are given by way of illustration only, and shall thus not limit the scope of the present invention.

DETAILED DESCRIPTION OF EMBODIMENTS

Figure 1:
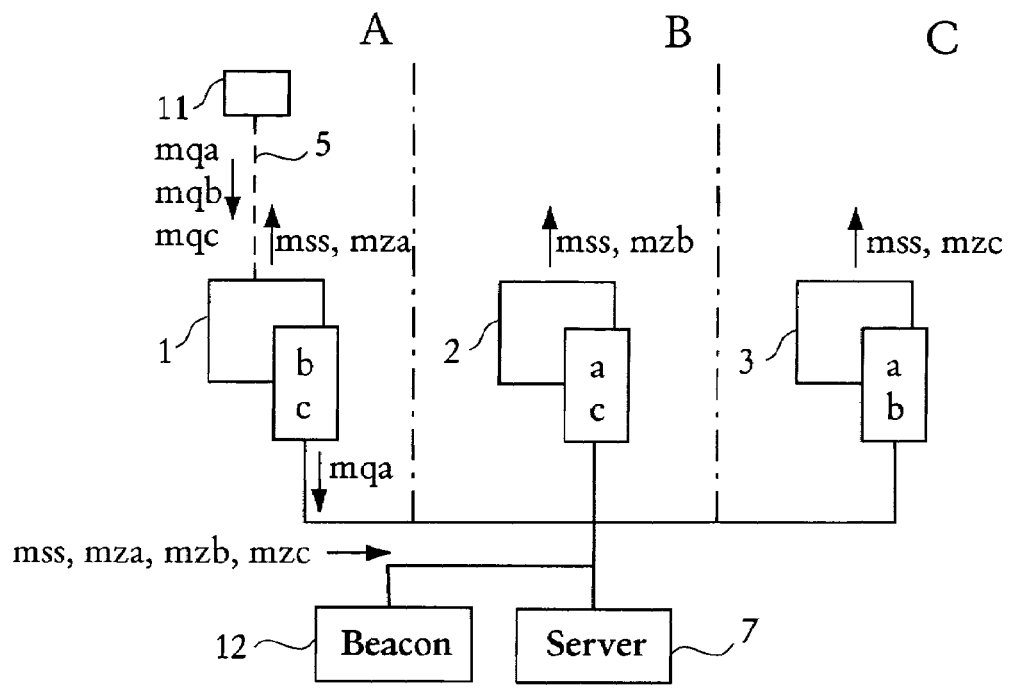
FIG. 1 is a schematic network layout for a network wherein the general principles of the present invention is illustrated.

FIG. 1 shows schematically a network layout for a network wherein a preferred embodiment of the present invention is implemented. The network includes a server 7 and a plurality of network nodes or access points, of which only three 1, 2, 3 are illustrated for sake of simplicity.

A user that wants to connect to the network has to connect via one of the access points. In FIG. 1 a communication unit 11 is connected to access point 1 as indicated by dashed line 5. The connection may be a wired or a wireless connection, e.g. radio connection.

Each of the access points 1, 2, 3 belongs to a geographically (or logically) delimited area or zone. In FIG. 1 access point 1 belongs to a zone A, access point 2 belongs to a zone B, and access point 3 belongs to a zone C. However, there is no restriction on the number of access points that belong to a single zone. The number of zones in a network can be as many as the number of access points in the network.

The server 7 may provide zone specific information in response to requests from the user of the communication unit 11, or the user of the communication unit 11 may want to process zone specific information locally on his communication unit 11. For this reason the server, the user/communication unit, or both need to know in which zone the communication unit 11 is connected.

The present invention addresses this issue, but before describing an inventive bi-directional message filtering algorithm for determining the zone in which the communication unit 11 is connected, a few definitions are given, which are used in the present text.

Definitions

Message
A set of information sent between a network device such as a beacon and communication units. A message belongs to a particular message class, is of a particular message type, and has a message content.

Message type
Each message is of a particular type. Messages are in the present invention filtered in accordance with their types, i.e. only messages of one or more particular types are allowed to pass through a particular network node or access point. The number of message types in a given network needed to implement the inventive algorithm should be one more than the number of zones in the network.

Message class
Each message belongs to a particular class. There are three different classes: synchronization message, zone message and query message.

Message content
Each message may have a content, i.e. some kind of data.

Message type meta data
Each message type can be described by meta data about that message type. The meta data can be used to trigger a party to either send messages of a particular message type or to listen for and receive messages of a particular message type.

Synchronization message
A message of this class is of a message type that both the beacon and the communication units have agreed upon. The message content of the synchronization message is the message type meta data for the existing zone messages.

Zone message
Messages of this class are sent out by the beacon. Communication units listen for this message as long as they still remain in the same zone.

Query message
Messages of this class are sent from the communication units to the beacon to ask for the zone the communication units are connected in.

Message filter
A filter that can stop certain messages from propagating any further depending on their message type.

Bi-directional Message Filtering Algorithm

The prerequisites needed in terms of particular hardware and software for implementing the inventive bi-directional message filtering algorithm in the network of FIG. 1 are that the access points are provided with message filters as defined above, i.e. the access points have capabilities of filtering messages according to their message type, and that a beacon 12 or other device is provided for sending synchronization and zone messages on the network and receiving query messages from the communication units connected to the network.

In the FIG. 1 embodiment the following messages are defined mss, mza, mzb, mzc, mqa, mqb and mqc. The class to which each message belongs and the message type of which it is are indicated in Table 1 below.

TABLE 1

Message classes and types.

| | Class | | | Type | | | |
|---|---|---|---|---|---|---|---|
| | Synchronization message | Zone message | Query message | a | b | c | s |
| mss | X | | | | | | X |
| mza | | X | | X | | | |
| mzb | | X | | | X | | |
| mzc | | X | | | | X | |
| mqa | | | X | X | | | |
| mqb | | | X | | X | | |
| mqc | | | X | | | X | |

From Table 1 it can be noted that for each message indicates the second letter the class and the third letter the type.

The filters of the access points 1, 2, 3 are set up as follows. The filter of access point 1, belonging to zone A, filters out messages that are of message types b and c and thus only messages of message type a are allowed to pass through access point 1. Similarly, the filter of access point 2, belonging to zone B, filters out messages that are of message types a and c and allow messages of message type b to pass through, and the filter of access point 3, belonging to the zone C, filters out messages that are of message types a and b and allow messages of message type c to pass through.

All filters allow messages of message type s, i.e. synchronization messages, to pass through.

Further, the beacon 12 has knowledge of all the zones A, B, C in the network, the corresponding message types a, b, c, and zone messages mza, mzb, mzc, as well as the message type s and the synchronization message mss. For purpose of the present invention only the synchronization message mss has a content of high importance, namely information as to all message types a, b, c for existing zone messages mza, mzb, mzc.

Preferably, but not necessarily, each of the communication units connecting to the network has knowledge of the message type s. This will be further discussed below with reference to FIG. 2.

In operation, the beacon 12 sends repeatedly out a synchronization message mss on the network, where the content of the synchronization message mss is the message type meta data for existing zone messages, i.e. descriptions of all message types a, b, c for existing zone messages mza, mzb, mzc. All access points 1, 2, 3 in the network are configured to let the synchronization message mss go through to the communication units connected.

The beacon 12 sends also repeatedly out the zone messages mza, mzb, mzc on the network, and of these only the zone message mza is passed through A access points, i.e. access point 1, only the zone message mzb is passed through zone B access points, i.e. access point 2, and only the zone message mzc is passed through zone C access points, i.e. access point 3. The reason for sending out the zone messages will be discussed farther below.

When a communication unit, e.g. communication unit 11, connects to the network it starts to listen for the synchronization message mss. Once it receives the synchronization message mss it parses the message to retrieve the information of the different message types a, b, c that exists.

Next, the communication unit 11 is triggered by the message type meta data in the synchronization message to translate each message type a, b, c into a respective query message mqa, mqb, mqc, which are sent towards its access point, which in FIG. 1 is access point 1. The communication unit 11 thus sends out one query message for each zone message type, or for each zone in the network. All but one mqa of the query messages mqa, mqb, mqc are filtered away by the filter in the access point 1, and thus only the message mqa reaches the beacon 12.

When the beacon 12 receives a query message mqa it may determine the zone in which the communication unit 11 is connected simply by means of determining the type of the message received and to retrieve the name of the corresponding zone. Then the beacon 12 may inform the communication unit 11 as to the zone in which it is connected, wherafter the communication unit 11 may send a request to the server 7 to obtain zone specific information.

Optionally, the beacon 12 informs the server 7 of the zone, in which the communication unit 11 is connected. Then the server 7 may check that the communication unit 11 requests correct zone information when sending a request to the server 7.

Alternatively, instead of that the beacon 12 informs the communication unit 11 as to the zone in which the communication unit 11 is connected, it may notify the server 7 of the zone, and then the server 7 informs the wireless device 11 of the zone.

Preferably, however, the correspondence between query message and zone is stored in the communication unit 11 (this information may be contained in the synchronization message mss), and when the beacon 12 receives the query message mqa it responds to the communication unit 11 by simply letting it know which query message (mqa) it received. The communication unit 11 then translates the query message to the zone.

All information sent after the beacon 12 has received the query message mqa as described in the four immediate above paragraphs, is sent in any convenient manner, and is not discussed in the section of definitions above. Preferably, the information is addressed directly as unicast messages to the devices to which the respective information shall be sent.

When the communication unit 11 has receive information of the zone in which is connected or information from which the zone is determinable the communication unit 11 keeps listening for zone messages of the message type, which corresponds to the zone in which it is, to know that it is still in the same zone. That is, as long as the communication unit 11 is in zone A, it will keep receiving messages mza from the beacon 12. But as soon as it enters another zone, e.g. zone B, and is handed over to an access point belonging to that zone, i.e. access point 2, it will no longer receive the message mza since it is filtered away by the filer of the access point 2. In this manner the communication unit 11 knows when it leaves a zone.

In FIG. 1 the transmissions of the synchronization message, the query messages and the zone messages are indicated by arrows. The filtering functionality at the access points is clearly illustrated.

When the communication unit 11 does not any longer receive the zone message it is listening for, it firstly checks that it is still receiving the synchronization message mss from the beacon 12. if this is the case it simply starts the process over again to find out in which zone it is, i.e. by sending.

In the inventive bi-directional message filtering algorithm described above, the communication unit 11 may need to register itself as a listener to different message types. This is necessary if for instance the algorithm is implemented using multicast messages as will be described below.

First Preferred Specific Embodiment

Figure 2:
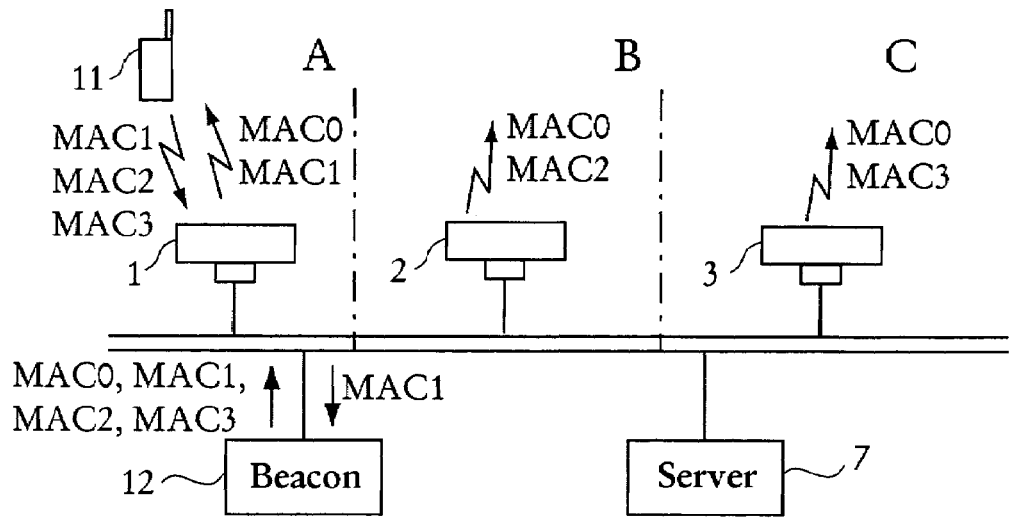
FIG. 2 is a schematic network layout for a wireless local area network wherein a first preferred specific embodiment of the present invention is implemented.

In FIG. 2 a schematic network layout for an IEEE 802.11b wireless local area network (WLAN) wherein a first preferred specific embodiment of the present invention is illustrated. The WLAN is indicated by the three access points 1, 2, 3 being connected to the server 7 and the beacon 12. A wireless communication unit such as a laptop computer or a PDA 11 may be connected to the network via anyone of the access points 1, 2, 3. Each of the server 7, the PDA 11, and the access points 1, 2, 3 has a unique hardware link layer address called MAC address (MAC, Media Access Control). These addresses are unicast MAC addresses. Further, there exist particular ranges of MAC addresses that are reserved for broadcast and multicast.

Each of the access points 1, 2, 3 has a capability of filtering messages based on their MAC address destination. Each filter may have an associated white list of MAC addresses, where only the messages destined to a MAC address appearing on the white list are let through the access point; all other messages are filtered away by the access point filter. Alternatively, each filter may have an associated black list of MAC addresses, where the messages destined to a MAC address appearing on the black list are filtered away by the access point filter, whereas all other messages are allowed to pass through the access point.

The inventive bi-directional message filtering algorithm is in this first specific embodiment of the invention based on multicast MAC addresses and MAC address filtering.

The number of multicast MAC addresses used in the algorithm will be one more than the number of zones defined. In FIG. 2 three zones A, B, C are defined, and each zone A, B, B covers a respective access point 1, 2, 3. The four multicast MAC addresses thus needed are schematically denoted MAC0, MAC1, MAC2, and MAC3. These multicast MAC addresses define different message types as described above with reference to FIG. 1. The message type MAC0 is associated with synchronization messages, MAC1 is associated with zone A, MAC2 is associated with zone B, and MAC3 is associated with zone C.

The MAC address filters are set up as follows. Each filter has an associated black list of MAC addresses, where each message destined to a MAC address appearing on the black list is filtered away. The filter of access point 1 has MAC2 and MAC3 on its black list, the filter of access point 2 has MAC1 and MAC3 on its black list, and the filter of access point 3 has MAC1 and MAC2 on its black list.

In advance the PDA 11 and the beacon decide upon which multicast MAC address to use for the synchronization messages, i.e. MAC0. Then the PDA 11 registers itself as a listener to the multicast group having MAC address MAC0, and the inventive bi-directional message filtering algorithm continues as being described with reference to FIG. 1. Only MAC addresses for the different messages (indicated by arrows) as sent on the network (by the different nodes therein, i.e. the beacon, 12 the PDA 11, and the access points 1, 2, 2) are indicated in FIG. 2, but as before messages belonging to the classes synchronization messages and zone messages are sent out by the beacon 12, whereas messages belonging to the class query messages are sent out by the PDA 11.

When the PDA 11 knows in which zone it is (Zone A in FIG. 2) it registers itself as a listener to the multicast group having MAC address MAC1. It may or may not stop listening for synchronization messages, i.e. leave the multicast group having MAC address MAC0, at this point. As long as the PDA 11 receives zone messages at the said address it knows that it is still in zone A.

If there exist zones in the network, in which there are multiple access points, actions have to be taken if a seemless handover from one to another one of the access points within that zone with respect to the inventive algorithm is to be obtained. A double timeout and registration process is needed to avoid having to perform the bi-directional filtering algorithm again (the process of receiving and analyzing a synchronization message, transmission of query messages, etc.).

In the embodiment described above the PDA needs to register itself as a listener to different message types. This is necessary since the message types are implemented as multicast groups, but it is also saving bandwidth: messages are not forwarded by the access points unless there are registered listeners connected to it.

The synchronization message could, however, be sent as a broadcast message in some environments, e.g. in those environments where all communication units possibly connecting to the network should be involved in the zone determination process.

The advantage of using synchronization messages is that the set of message types used can be sent out on the network repeatedly, and the communication units and the beacon do not have to agree in advance on the number of zones and their corresponding message types. Thus, a very dynamic zone configuration is obtained, and a new user needs in principle only have to know the message type for the synchronization message.

The strength of using broadcast synchronization messages is that no message type at all has to be agreed upon in advance by the user and the beacon. However, by using multicast synchronization messages less network bandwidth is used.

The advantage of using zone messages is that the communication unit has only to listen to the zone message corresponding to the zone, in which it is connected, as long as it stays within the zone. This saves processing capacity on the beacon and bandwidth capacity on the network. This is particularly beneficial if there are a large number of users on the network.

The advantage of using query messages is that the communication unit can obtain knowledge of the zone, in which it is connected, without having to register itself as a listener to all the different message types on the network. This is particularly beneficial if there are a large number of zones in the network.

Second Preferred Specific Embodiment

Figure 3:
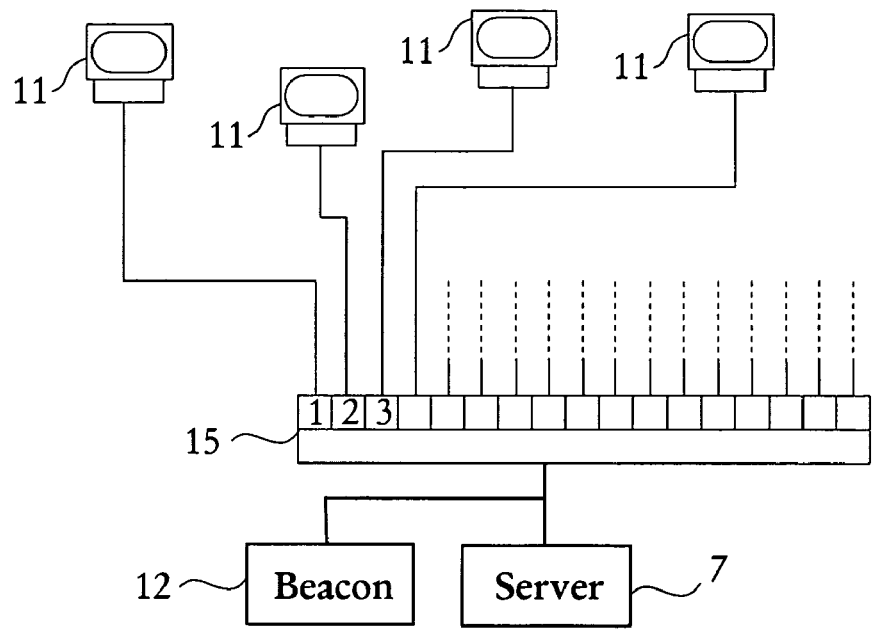
FIG. 3 is a schematic network layout for a wired local area network wherein a second preferred specific embodiment of the present invention is implemented.

Next, with reference to FIG. 3, which is a schematic network layout for a fixed IEEE 802 local area network, a second preferred embodiment of the present invention, will briefly be described.

The fixed local area network includes a multi-port switch 15 connected to the server 7 and the beacon 12. The multi-port switch 15 has a plurality of ports 1, 2, 3, . . . , each of which having capability of MAC address filtration. To each of the ports 1, 2, 3, . . . a respective wire is connected, via which an ordinary PC may connect to the network. In FIG. 3 four PC's are connected to the four first ports as counted from left to right.

The network, even though a fixed one, corresponds thus functionally as well as structurally to the wireless network of FIG. 2, at least as far as the present invention concerns. The inventive bi-directional filtering algorithm for determining a zone in which a PC 11 is connected, may be implemented identically as the algorithm as described with reference to FIG. 2 is implemented, i.e. by means of multicast messages and MAC address filtration.

This second preferred embodiment can be used during startup of network components, e.g. desktop computers might need to know their location within the network in order to download location-dependent settings from a central server during the boot process.

Third Preferred Specific Embodiment

Figure 4:
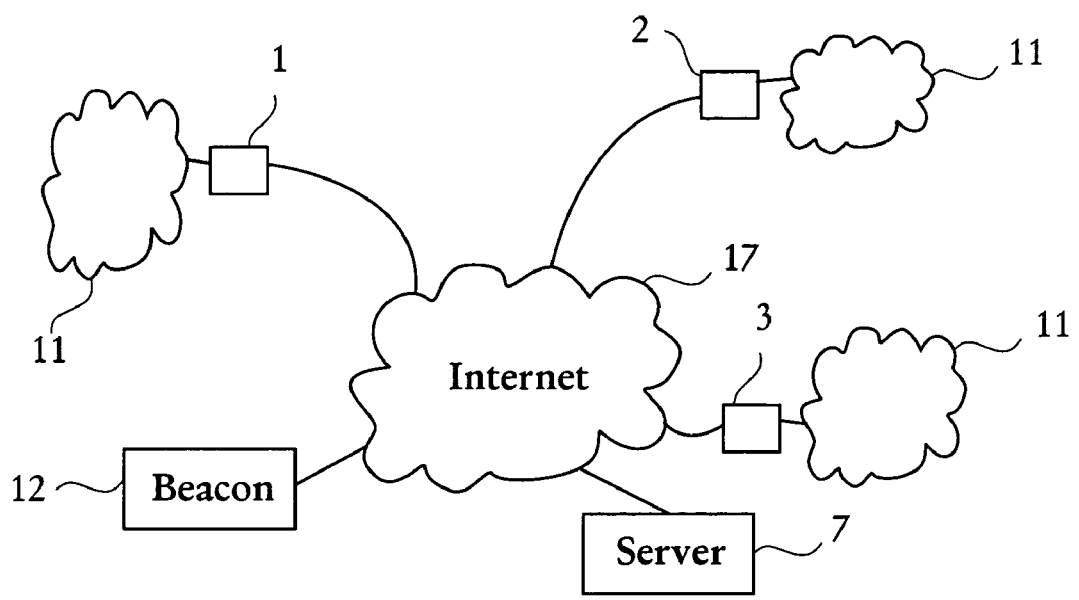
FIG. 4 is a schematic network layout for a wide area network wherein a third preferred specific embodiment of the present invention is implemented.

In FIG. 4 a schematic network layout for a wide area network is illustrated wherein a third preferred embodiment of the present is implemented. The wide area network includes three local area networks 11, which are connected to each other, each via a respective mail server 1, 2, 3, and a backbone network such as the Internet 17. As in previous embodiments the server 7 and the beacon 12 are connected to the backbone network.

Each mail server 1, 2, 3 (corresponding to an access point in the general embodiment described with reference to FIG. 1) has a capability of filtering e-mails (which are messages) based on some parameter, which may e.g. be any of content in address field, content in subject field, content in message field, or type of attached file (corresponding to message type).

The inventive bi-directional filtering algorithm may then be as follows assuming that mail server 1 belongs to zone A, mail server 2 belongs to zone B, and mail server 3 belongs to zone C. The beacon 12 sends repetitively synchronization e-mails to the users in the local area networks. These e-mails, which are not blocked by any of the mail servers 1, 2, 3, contain information as to all message types for existing zones in the network, i.e. message types for zones A, B, and C. A user in any of the local area networks 11, say the local area network 11 belonging to zone B, which receives the synchronization e-mail and analyzes it to find out the message types on the network. The user then sends query e-mails to the beacon 12, one of each message type.

Each of the mail servers 1, 2, 3 is set up to filter away e-mails (query e-mails or zone e-mails) that correspond to any of the zones, to which the e-mail server does not belong. This filtration is preferably bi-directional, but a simpler algorithm may be found even if the mail servers 1, 2, 3 are only capable of filtering in one direction, e.g. incoming e-mails, see next section for further discussions regarding uni-directional message filtration. Thus, of the query e-mails sent by the user in the local area network in zone B, all but the query e-mail of the message type corresponding to zone B are filtered away. Only the query e-mail of the type that corresponds to the zone B thus reaches the beacon 12, and the beacon retrieves information of the zone in which the user is connected, i.e. zone B, based on the message type of the query e-mail received, and informs subsequently the user of the zone in which he/she is connected.

The beacon may then at regular intervals send zone e-mails of each existing message type to the user, where only the zone e-mail corresponding to the zone in which the user is, is passed through the mail server of the local area network in which the user is connected. On receiving such e-mail the user know that he/she is still in the same zone and does not need to send query e-mails to the beacon 12.

While such an embodiment is easily implemented, it seems nevertheless not very practical. The time interval between each synchronization e-mail and between each set of zone e-mails has to be much longer than in the wireless network embodiment described with reference to FIG. 2 in order to avoid spamming the user with e-mails.

In a preferred version the synchronization e-mail is preferably addressed directly to a user upon request only, and the zone messages may be dispensed with since the user typically stays in a single zone during a longer period of time. In such an instance the algorithm is no longer a bi-directional filtering algorithm, but a uni-directional filtering algorithm. Zone dependent filtering is only performed in directions from the users towards the beacon.

In fact also the two first described specific embodiments (with reference to FIGS. 2 and 3) may in some implementations use simpler algorithms, which are shortly overviewed below.

Simplified Message Filtering Algorithms

It can be noted that while the bi-directional message filtering algorithm as described with reference to FIG. 1 is the preferred algorithm, an inventive bi-directional message filtering algorithm without synchronization, and a first and a second inventive uni-directional message filtering algorithms may find their applications.

The bi-directional message filtering algorithm and its implementations as described with reference to FIGS. 1–3 may be modified to not include the synchronization messages or their corresponding message type. The query messages may be sent out from the communication unit without being the communication unit being supplied with a synchronization message. However, each communication unit using the zone determination procedure has then to know in advance the number of zones in the network, and the message types corresponding to the zones. Such solution is more static than a solution involving synchronization messages.

Further, the first uni-directional message filtering algorithm is schematically outlined in the section above. Such algorithm is identical with the bi-directional message filtering algorithm as described with reference to FIG. 1 except for that no zone messages are sent from the beacon. Instead the communication unit has to send the query messages repeatedly, and the beacon has to inform (e.g. by unicast message) the communication unit of the zone, in which it is connected, after each received query message. Such solution may put a high load on the beacon, particularly if a large number of communication units are connected in the network and use the inventive zone determination algorithm. This uni-directional message filtering algorithm may thus be particularly applicable in a network with few users and many zones.

Finally, the second uni-directional message filtering is identical with the bi-directional message filtering algorithm as described with reference to FIG. 1 except for that no query messages are sent from the communication units. Instead each communication unit has to listen for zone messages of the message types corresponding to all existing zones in the network, and when receiving a zone message the communication unit analyzes the zone message, and determines the zone based on the message type of the zone message actually received. This may introduce a time delay in determining the zone, particularly if implemented by means of multicast MAC addresses and MAC address filtration as described above with reference to FIGS. 2–3. Then, each communication unit has to register itself as a listener to a multicast group for each zone existing in the network, and if the number of zones is high it will take a considerable time to listen through all corresponding multicast addresses, especially if the beacon does not send the zone messages too often. Thus, this uni-directional message filtering algorithm may be particularly applicable in a network with few zones and many users.

Anyone of the first and second uni-directional message filtering algorithms as described above may be further simplified to not use synchronization messages.

Particularly, in an implementation where the communication unit is capable of receiving messages of different message types simultaneously, the synchronization messages and/or any of the zone messages or the query messages may be dispensed with. This may be the case also for the implementation with multicast MAC addresses and MAC address filtration if the communication unit is arranged to listen to several multicast groups simultaneously.

It shall be appreciated to a man skilled in the art that the invention may be varied in a plurality of more ways within the scope of the appended patent claims.

The invention claimed is:

1. In a network including a plurality of access points, via which communication units can connect to the network, wherein each of said plurality of access points belongs to a zone, a method for determining the zone to which one of said plurality of access points, via which a communication unit is connected to the network, belongs, comprising the steps of:

assigning a message type to each of the zones in the network;

receiving from said communication unit a query message for each zone in the network, where the query message for each zone is of the message type assigned to that zone;

filtering said query messages at said one of said plurality of access points, via which said communication unit is connected to the network, so that only the query message of the message type, which is assigned to the zone to which said one of said plurality of access points belongs, is allowed to pass through; and determining the zone, to which said one of said plurality of access points belongs, depending on the query message allowed to pass through in said step of filtering.

2. The method of claim 1 comprising sending out on the network a synchronization message containing information as to the message types of the zones in the network.

3. The method of claim 2 wherein said synchronization message is sent out on the network repeatedly.

4. The method of claim 3 wherein the step of receiving from said communication unit said query messages is an indication of that said communication unit has received said synchronization message.

5. The method of claim 2 wherein said synchronization message is multicast to registered communication units in the network.

6. The method of claim 2 wherein said synchronization message is broadcast to all communication units in the network.

7. The method of claim 1 wherein a zone message for each zone in the network is sent out on the network, where the zone message for each zone is of the message type assigned to that zone;

said zone messages are filtered at said one of said plurality of access points, via which said communication unit is connected to the network, so that only the zone message of the message type, which is assigned to the zone to which said one of said plurality of access points belongs, is allowed to pass through towards said communication unit; and the zone, to which said one of said plurality of access points belongs, is determined depending on the zone message allowed to pass through in said step of filtering zone messages.

8. The method of claim 7 wherein said zone messages are sent out on the network repeatedly.

9. The method of claim 8 wherein said steps of receiving query messages; filtering said query messages; and determining the zone are repeated.

10. The method of claim 9 wherein said repeated steps of receiving query messages; filtering said query messages; and determining the zone is an indication of that said communication unit does not receive the zone message allowed to pass through towards said communication unit.

11. The method of claim 1 wherein the network is a wireless network, and the communication unit is a wireless radio communication device.

12. The method of claim 11 wherein the wireless network is a wireless local area network and the wireless radio communication device is a laptop or a PDA.

13. The method of claim 1 wherein each of said message types has a uniquely defined multicast address and each step of filtering in said method is based on said uniquely defined multicast address.

14. The method of claim 13 wherein said uniquely defined multicast address is a multicast media access control address and each step of filtering is based on media access control address filtration.

15. The method of claim 1 wherein a plurality of access points belong to a single zone.

16. The method of claim 1 further comprising the step of sending information to a server in the network, which identifies the zone determined as the zone to which said one of said plurality of access points, via which a communication unit is connected to the network, belongs.

17. The method of claim 1 further comprising the step of sending information to said communication unit, which identifies the zone determined as the zone to which said one of said plurality of access points, via which a communication unit is connected to the network, belongs.

18. The method of claim 1 further comprising the step of receiving a request from said communication unit to provide said communication unit with zone dependent information.

19. In a network including a plurality of access points, via which communication units can connect to the network, wherein each of said plurality of access points belongs to a zone, a method for determining the zone to which one of said plurality of access points, via which a communication unit is connected to the network, belongs, comprising the steps of:
assigning a message type to each of the zones in the network;
sending out on the network a zone message for each zone in the network, where the zone message for each zone is of the message type assigned to that zone; and
filtering said zone messages at said one of said plurality of access points, via which said communication unit is connected to the network, so that only the zone message of the message type, which is assigned to the zone to which said one of said plurality of access points belongs, is allowed to pass through towards said communication unit; and
determining the zone, to which said one of said plurality of access points belongs, depending on the zone message allowed to pass through in said step of filtering.

20. The method of claim 19 wherein said zone messages are sent out on the network repeatedly.

21. The method of claim 19 wherein a query message for each zone in the network is received from said communication unit, where the query message for each zone is of the message type assigned to that zone;
said query messages are filtered at said one of said plurality of access points, via which said communication unit is connected to the network, so that only the query message of the message type, which is assigned to the zone to which said one of said plurality of access points belongs, is allowed to pass through; and
the zone, to which said one of said plurality of access points belongs, is determined depending on the query message allowed to pass through in said step of filtering query messages.

22. The method of claim 21 wherein a synchronization message containing information as to the message types of the zones in the network is sent out on the network.

23. The method of claim 22 wherein said synchronization message is sent out on the network repeatedly.

24. The method of claim 22 wherein the step of receiving from said communication unit said query messages is an indication of that said communication unit has received said synchronization message.

25. The method of claim 19 wherein the network is a wireless network, and the communication unit is a wireless radio communication device.

26. The method of claim 25 wherein the wireless network is a wireless local area network, and the wireless radio communication device is a laptop or a PDA.

27. The method of claim 19 wherein each of said message types has a uniquely defined multicast address, and each step of filtering in said method is based on said uniquely defined multicast address.

28. The method of claim 27 wherein each of said uniquely defined multicast addresses is a media access control address.

29. In a network including a plurality of access points, via which communication units can connect to the network, wherein each of said plurality of access points belongs to a zone, an arrangement for determining the zone to which one of said plurality of access points, via which a communication unit is connected to the network, belongs, comprising:
means for assigning a message type to each of the zones in the network;
a filter arrangement for filtering query messages from said communication unit, where said query messages include one query message for each zone in the network, and where the query message for each zone is of the message type assigned to that zone, at said one of said plurality of access points, via which said communication unit is connected to the network, so that only the query message of the message type, which is assigned to the zone to which said one of said plurality of access points belongs, is allowed to pass through; and
means for determining the zone, to which said one of said plurality of access points belongs, depending on the query message allowed to pass through.

30. The arrangement of claim 29 comprising a transmitter for sending out on the network a synchronization message containing information as to the message types of the zones in the network.

31. The arrangement of claim 29 wherein each of said message types has a uniquely defined multicast address, and said step of filtering is based on said uniquely defined multicast address.

32. In a network including a plurality of access points, via which communication units can connect to the network, wherein each of said plurality of access points belongs to a zone,. an arrangement for determining the zone to which one of said plurality of access points, via which a communication unit is connected to the network, belongs, comprising:
- means for assigning a message type to each of the zones in the network;
- a transmitter for sending out on the network a zone message for each zone in the network, where the zone message for each zone is of the message type assigned to that zone; and
- a filter arrangement for filtering said zone messages at said one of said plurality of access points, via which said communication unit is connected to the network, so that only the zone message of the message type, which is assigned to the zone to which said one of said plurality of access points belongs, is allowed to pass through towards said communication unit; and
- means for determining the zone, to which said one of said plurality of access points belongs, depending on the zone message allowed to pass through in said step of filtering.

33. The arrangement of claim 32 wherein said filter arrangement is adapted to filter query messages from said communication unit, where said query messages include one query message for each zone in the network, and where the query message for each zone is of the message type assigned to that zone, at said one of said plurality of access points, via which said communication unit is connected to the network, so that only the query message of the message type, which is assigned to the zone to which said one of said plurality of access points belongs, is allowed to pass through; and
- said determining means is adapted to determine the zone, to which said one of said plurality of access points belongs, depending on the query message allowed to pass through.

34. The arrangement of claim 32 wherein each of said message types has a uniquely defined multicast address, and said step of filtering is based on said uniquely defined multicast address.

35. The arrangement of claim 31 wherein each of said uniquely defined multicast addresses is a media access control address.

36. The arrangement of claim 34 wherein each of said uniquely defined multicast addresses is a media access control address.

* * * * *